May 6, 1958        E. E. MARTIN        2,833,542
APPARATUS FOR DISTRIBUTING PARTICLES ALONG A SURFACE
Filed Feb. 14, 1952        3 Sheets-Sheet 1
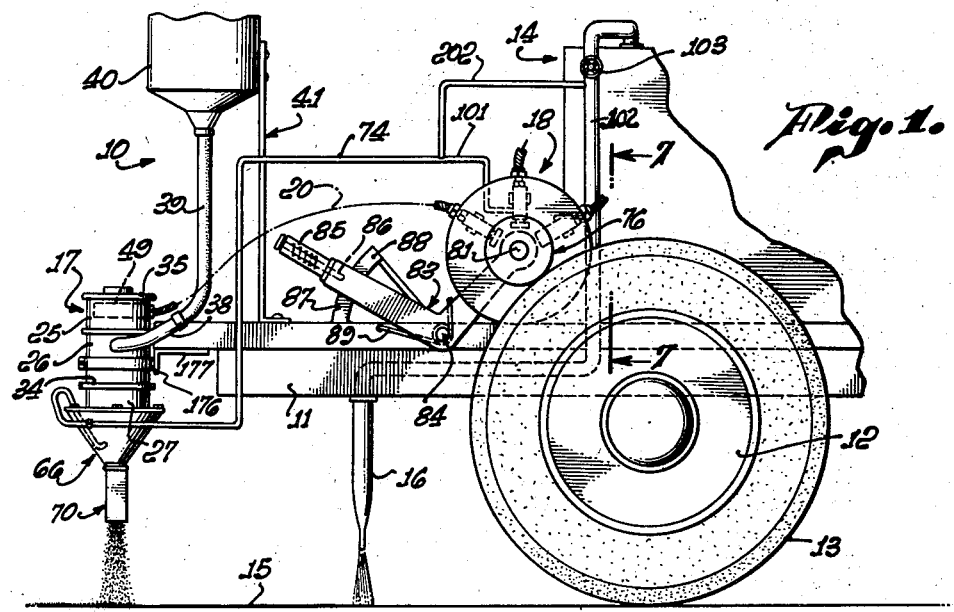
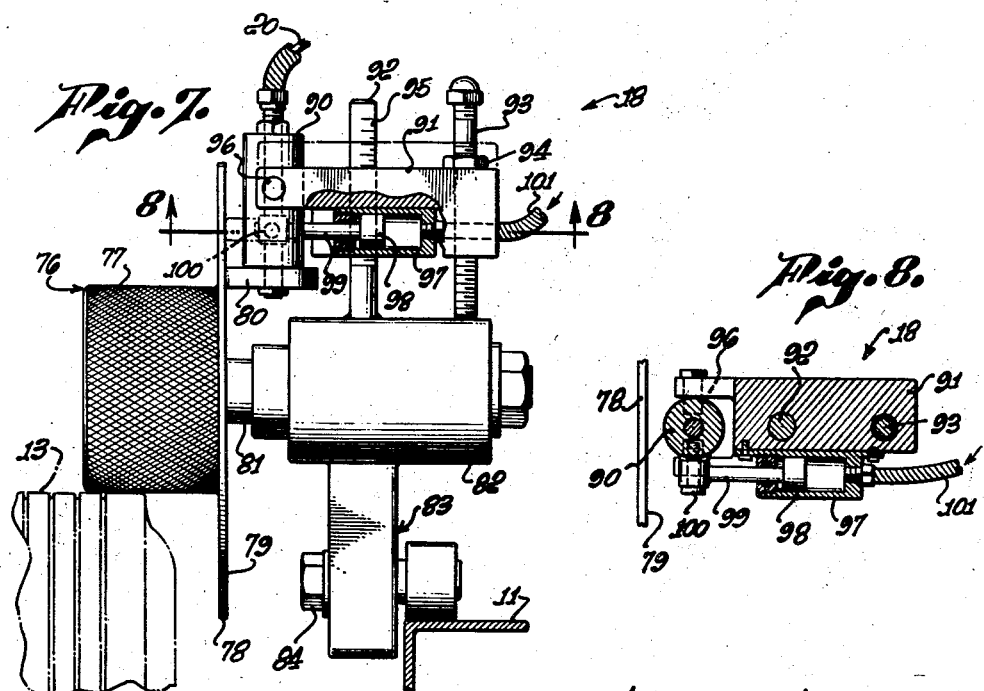
EARNEST E. MARTIN,
INVENTOR.
BY
H. Calvin White
ATTORNEY.

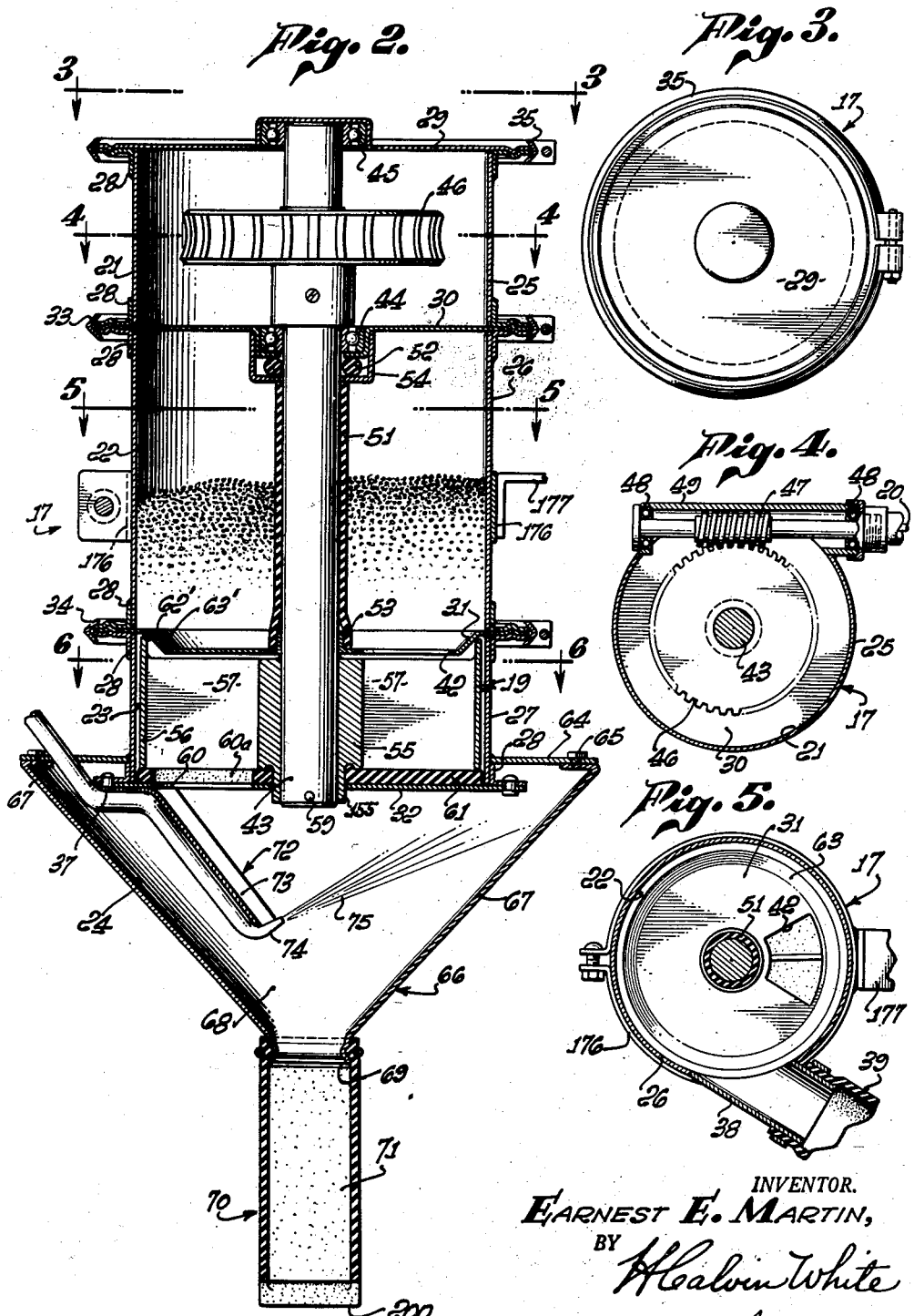

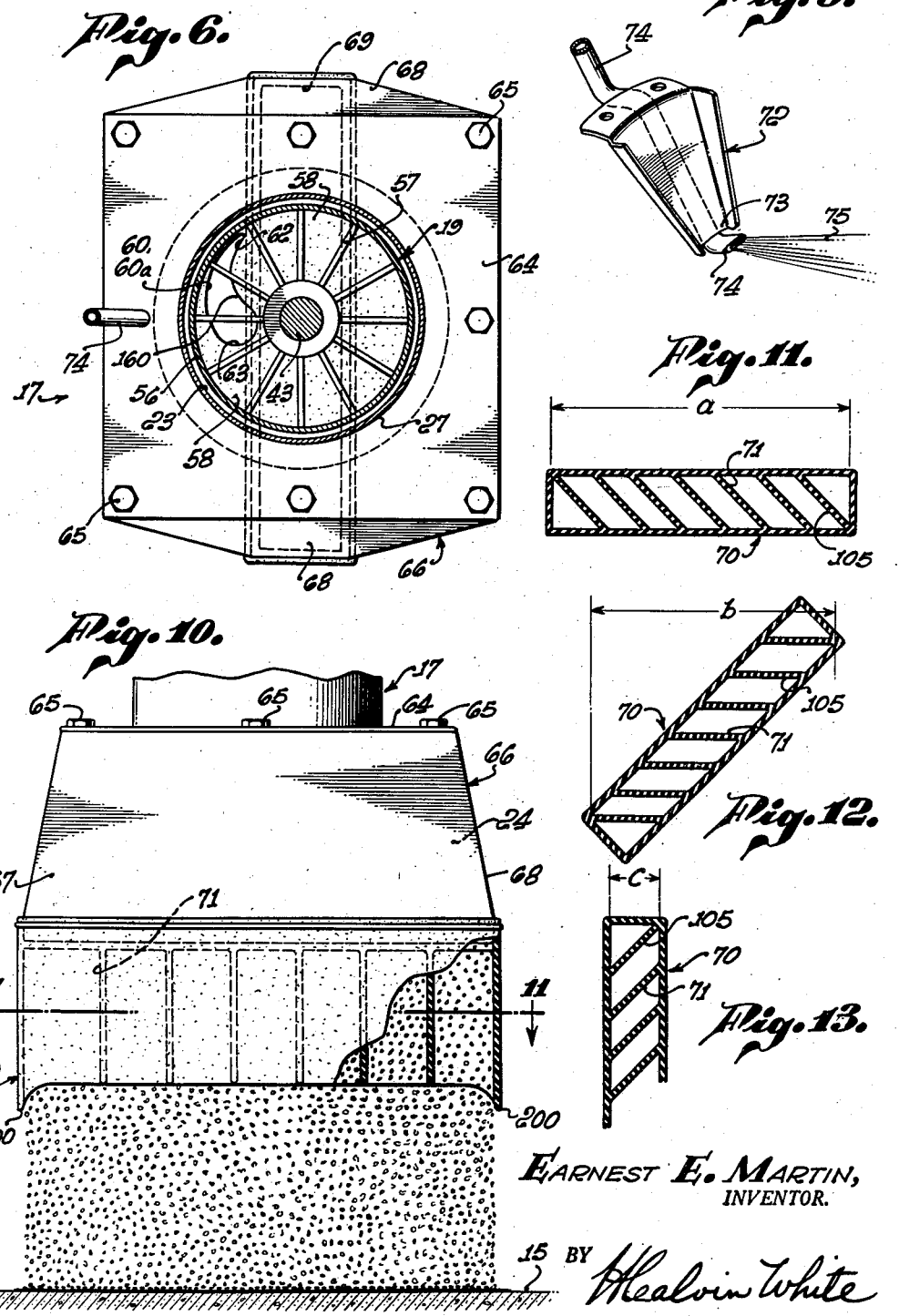

United States Patent Office 2,833,542
Patented May 6, 1958

2,833,542
APPARATUS FOR DISTRIBUTING PARTICLES ALONG A SURFACE

Earnest E. Martin, Pasadena, Calif., assignor to George D. Bavin, Los Angeles, Calif.

Application February 14, 1952, Serial No. 271,608

2 Claims. (Cl. 275—2)

This invention relates to improved dispensers for distributing small discrete particles along a work surface. Though certain features of the invention are broadly applicable to various types of dispensers, devices embodying the invention are particularly adapted for distributing glass spheres or beads along a painted road stripe, and will be described as applied to that use.

In laying a reflective road stripe, it is customary to employ, in conjunction with a conventional striping machine for applying the paint, a bead dispenser mounted to the rear of the striper and acting to deposit beads along the painted stripe. A major object of the present invention is to provide an improved type of dispenser for this purpose, which is considerably more reliable and accurate in its rate of bead delivery, as well as more versatile for use under different conditions, than prior dispensers have been. For one thing, dispensers embodying the invention are so constructed as to automatically and very accurately vary the rate of bead delivery in exact accordance with variations in the rate of dispenser travel along the road surface. Thus, the density of beads distributed along the painted stripe is constant in spite of variations in the speed of travel. Also, the dispenser is specially designed to permit accurate adjustment of the width of the area along which beads are deposited, so that a single dispenser may serve for the laying of any of numerous different widths of stripes.

Dispensing equipment embodying the invention includes generally a drive unit responsive to the rate of travel over a road surface, and a dispenser unit operable by the drive unit to dispense beads at a rate varying with said rate of travel. A particular object of the invention is to provide apparatus of this character in which a plurality of dispenser units, for simultaneously laying beads along a plurality of parallel stripes, may be operated by a single drive unit. Other features of the invention have to do with the special formation of the apparatus for ease of application to any standard type of road striping machine, as well as for inexpensive manufacture, and capacity for operation over a very long active life with a minimum of wear on its moving parts.

Structurally, the dispenser unit proper preferably includes a metering rotor mounted for rotation about a vertical axis and containing a number of metering bead compartments spaced about its axis. Beads are introduced into these compartments at a predetermined filling point along their circular path of travel, and are discharged downwardly at a second and circularly offset point. As the rotor continuously turns, it thus serves to deliver beads from an upper bead chamber to a lower discharge chamber, at a rate varying in exact accordance with the rate of rotor rotation. This rotation is in turn controlled by the drive unit in accordance with the rate of movement of the dispenser along a road surface.

In order to minimize the wear on the rotor during operation, I find it highly desirable to form the rotor in a manner maintaining a clearance between the top and sides of the rotor and the adjacent walls of the compartment within which it is contained. When such clearance is provided, the invention contemplates specially forming the rotor to prevent the flow of beads along the clearance to the space at the sides of the rotor. Specifically, the radially outer portion of the rotor may be provided with a peripheral upwardly projecting flange acting as a barrier to retain the beads within the rotor compartments. To increase the effectiveness of this flange, the top wall of the rotor chamber may be locally elevated at only the location of the flange, and extend considerably lower at the radially inner locations of the metering compartments.

To permit adjustment of the dispenser for different width stripes, the dispenser may have a lower discharge portion acting to dispense beads downwardly in a horizontally elongated pattern, and which is rotatable or otherwise movable in a manner varying the angle of the dispensed pattern with respect to the stripe being formed, to thus vary the width of the stripe. Also, I find it desirable to provide for rotational adjustment of other portions of the dispenser body, to facilitate their connection to a bead supply reservoir and the speed responsive drive unit.

For assuring even distribution of the beads over the stripe area, I preferably introduce compressed air into the discharge portion or discharge chamber of the dispenser in a manner thoroughly agitating the beads and causing their delivery from the dispenser in an absolutely uniform pattern. For this purpose, a jet of air may be directed horizontally directly into the path of the beads falling from the metering rotor. Such compressed air also serves the purpose of slightly pressurizing the discharge portion of the dispenser to accelerate the downward motion of the beads and assure their proper embedding in and retention by the paint.

The dispenser drive unit, for responding to variations in speed of travel, may comprise a drive member adapted for rotation at a rate varying in accordance with the speed of travel, and presenting a radial drive face which is tangentially engaged by and acts to rotate an associated roller. The roller in turn may be connected to the dispenser to operate it at a rate varying with the rate of travel. To adjust the density of bead distribution along the road surface, the roller is adjustable radially of the drive member to engage different portions of its driving face, and thus vary the relative rates of rotation of the member and roller. The use of this type drive is especially important in attaining a continuous regulation of the dispensing rate. Also, the type drive renders possible the actuation of a number of dispensers from a single drive member, since more than one roller may engage and be driven by a common radial face on one rotary member.

Preferably, I control starting and stopping of bead delivery by actuating the roller into and out of engagement with the drive member. Such actuation may be effected by a power unit, such as a piston and cylinder mechanism, operable by compressed air when the air is turned on to the paint spraying gun.

The above and other features and objects of the present invention will be better understood from the following detailed description of the typical embodiment illustrated in the accompanying drawings, in which:

Fig. 1 is a fragmentary side view of the rear portion of a wheeled road striping machine, to which has been mounted bead dispensing apparatus constructed in accordance with the present invention;

Fig. 2 is an enlarged fragmentary vertical section through the dispenser of Fig. 1;

Figs. 3, 4, 5 and 6 are horizontal sections taken on lines 3—3, 4—4, 5—5 and 6—6 respectively of Fig. 2;

Fig. 7 is an enlarged view of the drive unit for the dispenser, taken mainly along line 7—7 of Fig. 1;

Fig. 8 is a sectional view taken on line 8—8 of Fig. 7;

Fig. 9 is an enlarged fragmentary perspective view of the bead chute and air directing conduit located within the bead discharge chamber of the dispenser.

Fig. 10 is an end view, partly broken away, of the lower discharge portion of the dispenser; and Figs. 11, 12 and 13 are horizontal sections through the discharge spout, taken on line 11—11 of Fig. 10, and showing the spout in three different positions for laying different width lines.

Referring first to Fig. 1, the bead dispensing apparatus 10 of the present invention is shown mounted to a conventional road striping machine including a carriage 11 having wheels 12 carrying road engaging tires 13 (only one shown). Carriage 11 mounts the usual painting apparatus 14, which sprays paint downwardly onto road surface 15 through spray nozzle 16 as the carriage is moved along the road, to form a painted stripe on the surface of the road. In use, the paint striping machine is moved to the right, as seen in Fig. 1, so that the bead dispensing apparatus follows the spray nozzle 16, to dispense beads along the painted stripe.

The bead dispensing apparatus includes essentially a dispenser unit 17 from which the beads are delivered onto the road surface, and a dispenser actuating or drive unit 18 which engages and is driven by ground engaging tire 13 of the carriage. The rate of bead delivery from the dispenser is varied by control of the rate of rotation of a metering rotor 19 (see Fig. 2), which is driven by drive unit 18 through a flexible rotary shaft 20 at a rate varying with changes in the speed of carriage travel.

With particular reference now to Fig. 2, the body of the dispenser proper contains four vertically successive chambers, including from top to bottom an upper gear chamber 21, a bead chamber 22, a rotor chamber 23, and a lower bead discharge chamber 24. The upper three of these chambers, that is, numbers 21, 22 and 23, have vertically extending and alined cylindrical side walls 25, 26 and 27, respectively. Each of these side walls carries at its upper and lower ends a pair of flange elements 28 for fastening the side walls together and to a number of circular horizontal walls or partitions 29, 30, 31 and 32. The horizontal walls define the tops and bottoms of the various chambers in the dispenser body.

At the top and bottom of central bead chamber 22, the flanges 28 and intermediate horizontal partitions are clamped together by a pair of circular clamps 33 and 34 adapted to be tightened about the outer edges of the flanges and partitions by tightening of the clamp fasteners 35. Clamps 33 are essentially V-shaped in transverse section (see Fig. 2), to wedge the flange elements 28 tightly together as the clamp is tightened. The employment of such circular clamps permits relative rotary adjustment of the three chambers 21, 22 and 23 upon loosening of the clamps, to attain purposes later to be discussed. In such rotary adjustment, the lower discharge chamber 24 is carried by and positioned angularly in accordance with the rotor chamber 23.

The upper horizontal wall 29, forming the upper wall of gear chamber 21, may be fastened to the uppermost flange element 28 by a V-clamp 35 similar to clamps 33 and 34. The bottom horizontal wall 32, forming the bottom of rotor chamber 23 may be fastened to the lowermost flange element 28 in any suitable manner, as by a number of circularly spaced rivets 37.

Beads are introduced into bead chamber 22 through inlet tube 38 connecting tangentially into the side wall of that chamber. The beads are supplied in a continuous stream to this inlet tube through flexible hose 39 leading from an upper bead reservoir 40, which is mounted to carriage 11 in any suitable manner, as by an upstanding mounting bracket 41. During operation of the dispenser, the beads leave chamber 22 for delivery to rotor 19 through an opening 42 in the bottom wall 31 of the bead chamber. This opening is preferably shaped essentially as a sector of a circle centered about the vertical central axis of the dispenser body.

Rotor 19 is carried and adapted to be rotated about a vertical axis by a vertically extending drive shaft 43. This shaft extends upwardly through chambers 22 and 21, and is journalled in a pair of ball bearing units 44 and 45 carried by upper and lower walls 29 and 30 of the gear chamber 21. Within the gear chamber, shaft 43 carries a rigidly attached worm gear 46, which is engaged and driven by a horizontally extending worm 47 (see Fig. 4). This worm is journalled in a pair of bearings 48 carried by a tubular open sided element 49 attached to side wall 25 of the gear chamber. The worm is connected to and driven by flexible drive shaft 20, leading from the wheel engaging drive unit 18.

Within body chamber 22, suitable means may be provided for protecting the shaft 43 against wear from engagement with the beads, and for preventing the leakage of beads from the bead chamber along the outside of the shaft. For these purposes, I may employ a rubber or other flexible sleeve 51 within the bead chamber and about the shaft, and an upper seal ring 52 about the shaft and beneath bearing 44. The lower end of sleeve 51 may extend downwardly about a tubular axially extending inner portion 53 of the chamber bottom wall 31, to form a positive seal against the downflow of beads along the outside of the shaft. The seal ring 52 may be retained in position by a suitable annular sheet metal retaining member 54 attached to upper wall 30 of the bead chamber.

Rotor 19 is of essentially cylindrical configuration corresponding substantially to the chamber 23 within which it is rotatably mounted. Structurally, the rotor includes a radially inner vertically extending cylindrical hub 55, a radially outer vertically extending cylindrical wall 56, and a number of circularly spaced vertical partitions 57 extending radially between hub 55 and wall 56. By virtue of this formation, rotor 19 contains a number of bead metering compartments 58 formed between the various radial partitions 57, and having open upper ends for receiving beads and open lower ends for discharging beads. The inner hub 55 of the rotor is suitably fastened in fixed relation to the drive shaft 43, as by a pin 59 extending transversely through registering openings in the shaft and a lower extension 155 of the hub, the pin preferably extending through these parts at an easily accessible location beneath horizontal wall 32.

As each compartment 58 passes beneath opening 42 in the top wall 31 of the rotor chamber, beads fall downwardly from the upper bead chamber 22 into the compartment. The beads are carried in the filled compartment along its circular course of travel to a discharge location circularly offset from filling opening 42, and at which bottom wall 32 of the rotor chamber contains an opening 60 for passing the beads downwardly into lower discharge chamber 24. To prevent bead leakage between different compartments of the rotor and about the underside of the rotor, a sheet-like sealing element 61 extends across the upper surface of wall 32 and engages the bottom of the rotor. Sealing element 61 may be formed of a suitable resilient sealing material, such as rubber, preferably bonded to wall 32. Sealing element 61 of course contains a discharge opening 60a registering with opening 60 of wall 32. It has been found desirable that these discharge openings 60 and 60a be shaped to progressively increase in width in the direction of rotation of the rotor, and from a relatively small dimension first end 62 through which beads first commence to discharge from a particular rotor compartment, to a relatively wide second end 63 extending across a major portion of the radial extent of the rotor compartment. Preferably, the inner edge 160 of openings 60, 60a curves radially inwardly as it advances in the direction of rotor rotation, so that the engaging rotor partitions tend to move the sealing material at edge 160 toward, rather than away from or along, the edges of the opening, with a resultant minimization of wear on the seal member.

To prevent excessive wear of the rotor during operation, the side and top portions of the rotor preferably do not engage but are spaced a short distance from the adjacent side and top walls of the rotor compartment 23. At the same time, these side and top portions of the rotor are of course positioned in very proximate relation to the adjacent chamber walls, to retain the beads being handled within the various rotor compartments. Such retention of the beads within the rotor compartments is encouraged by forming the radially outer wall 56 of the rotor to project upwardly at 62', see Fig. 2, beyond the upper edges of hub 55 and partitions 57, to form a peripheral upwardly projecting flange or barrier preventing the passage of beads outwardly about the upper edge of the rotor wall 56 to the space at the outside of the rotor. The effectiveness of rotor wall 56 in thus retaining the beads is enhanced by circularly deforming top wall 31 of the rotor to extend angularly downwardly at a location 63' radially inwardly of the outer rotor wall 62' and to then extend horizontally in proximate but spaced relation to the upper edges of partitions 57 and hub 55.

The bottom bead discharge chamber 24 of the dispenser includes a horizontal upper wall 64 extending about and secured in fixed relation to side wall 27 of the rotor chamber. Extending downwardly from the outer edge of top wall 64 and secured to the top wall by fasteners 65, is a box-like downwardly converging portion 66 of the discharge chamber. This portion 66 of the discharge chamber has a first pair of spaced side walls 67 converging downwardly, and a second pair of opposite side walls 68 which slightly diverge downwardly. These four walls 67 and 68 form together at their lower ends a bottom rectangular horizontally elongated bead discharge opening 69, as indicated in broken lines in Fig. 6.

At the location of this bottom outlet, the discharge chamber carries a vertically extending discharge spout 70, of rectangular configuration corresponding substantially to outlet 69. Spout 70 is adapted to pass beads downwardly therethrough, and is formed of a suitable resiliently deformable material such as rubber, to permit its deflection by any road markers or other irregularities which it may engage, and to be automatically returnable to its normal vertical condition after such deflection. As seen in Figs. 11, 12 and 13, discharge spout 70 contains a number of vertically extending partitions 71, disposed angularly to both its longitudinal and transverse axes, to guide the beads in their downward travel through the spout in a manner assuring their even distribution along the entire extent of the rectangular discharge pattern. To prevent outward flaring of the beads at the sides of the discharge pattern, it has been found desirable to extend the opposite side walls of the spout downwardly at 200 (see Fig. 10) beyond the intermediate portion of the spout, to positively direct the beads at the sides of the pattern directly downwardly. Preferably, the front and rear walls of the spout extend progressively farther downwardly near the sides of the spout, curving downwardly to join with the lower edges of the side walls.

The width of the area along which beads are dispensed may be varied by bodily rotatively adjusting discharge spout 70, discharge chamber 24, and rotor chamber 23 relative to the uppers portions of the dispenser. Such rotary adjustment of the lower portion of the dispenser is permitted by its circular clamp type connection at 34 to the upper part of the dispenser. When the rotary position of the horizontally elongated rectangular spout is such that its major dimension extends directly transversely of the path of carriage movement (see Fig. 11), the beads are distributed across an area "a" of maximum width. For laying stripes of lesser widths, the spout may be turned to an angular relation such as that shown in Fig. 12, in which the spout does not extend directly transversely of the path of movement, and the stripe is of a reduced width "b." A stripe of minimum width "c" may be formed by turning the spout to its Fig. 13 position, in which the major dimension of the spout extends directly along the stripe or path of movement.

In all rotary positions of the spout, partitions 71 within the spout guide the beads in their downward movement in a manner assuring even distribution of the beads across the entire width of the stripe being formed. In rotationally adjusting the spout, it is turned from its transverse position in a direction such that partitions 71 always remain at an angle to the path of movement (see Figs. 12 and 13). As a result, adjacent ones of the angular vertical channels 105 formed within the spout between partitions 71 are always in overlapping relation transversely of the stripe being formed, so that no interruption of the bead distribution across the stripe is caused by the partitions themselves. The angularity of partitions 71 is such as to assure substantial transverse overlapping of the spout channels 105 in even the transverse or maximum width position of the spout.

As the beads fall downwardly from the rotor chamber into discharge chamber 24 through opening 60, they engage and are directed along an inclined downwardly tapering chute 72, which is fastened to the underside of bottom wall 32 of the rotor chamber (see Figs. 2 and 9). Chute 72 has a bottom open discharge end 73, across the underside of which a conduit 74 directs a generally horizontal stream or jet 75 of compressed air. The discharge portion of conduit 74 is preferably directed at a slight upward angle, say about 20°, to direct the air jet at a correspondingly upward angle. The air jet acts to carry the beads leaving the chute horizontally across and upwardly within chamber 24, to engage the opposed wall 67 of the chamber and be deflected in a manner dispersing the beads within chamber 24, and thus assuring their even distribution over the entire area of the bead discharge pattern. The air introduced through conduit 74 also serves to increase the pressure within chamber 24 as compared with the pressure at the outside of the dispenser, to cause a flow of air downwardly through spout 70 acting to accelerate the downward motion of beads leaving the chamber, and as a result assuring their proper embedding in and permanent retention by the paint onto which they are dispensed. Compressed air conduit 74 may be positioned relative to chute 72 by forming it to extend upwardly along and be brazed or otherwise secured to the underside of the chute.

The dispenser is mounted to carriage 11 in a manner permitting rotation of each of the various previously discussed sections of the dispenser relative to the carriage. For this purpose, the dispenser may include a mounting element 176 comprising a circular clamp disposed about side wall 26 of bead chamber 22, and attached to the carriage by a suitable mounting bracket 177. As will be appreciated, loosening of clamp 176 frees the bead chamber for rotation relative to the carriage.

The drive unit 18 for actuating the dispenser includes a rotatable drive member 76 adapted to engage the outer road engaging surface of tire 13 and be rotated by the tire about an axis extending parallel to the axis of wheel 12. When thus driven by the tire, member 76 of course rotates at a rate varying in accordance with variations in the rate of movement of the road striping machine along the road surface. Member 76 includes a cylindrical externally knurled or roughened tire engaging portion 77, and an increased diameter flange-like portion 78 at an inner end of cylindrical portion 77. At a side of its increased diameter portion 78 directed away from tire engaging portion 77, drive member 76 presents a radially extending face 79, which is tangentially engaged by and drives one or more rollers 80. Each of these rollers 80 is connected to and rotates a flexible drive shaft 20 leading to a corresponding dispenser unit 17. Where more than one dispensing unit is employed, the individual rollers 80 engage face 79 at circularly spaced locations. As will appear, each roller is mounted for adjustment radially of member 76 in engagement with its face 79 to thus vary the rate at which the roller and associated dispenser are driven relative to the angular rate of rotation of member 76 itself.

Tire engaging drive member 76 is mounted for its rotation by a shaft 81, projecting from an essentially cylindrical body 82 positioned opposite a central portion of roller engaging face 79. Body 82 is in turn carried by an angular lever 83, which is mounted to the carriage at 84 for pivotal movement in a manner swinging member 76 into and out of engagement with tire 13. Lever 83 has a handle portion 85 by which it is actuated, and which is releasably retainable in a retracted position by a detent element 86 receivable within a notch 87 in a positioning sector element 88 secured to carriage 11. Lever 83 is yieldingly urged by a spring 89 in a direction retaining drive member 76 in engagement with tire 13.

Each of the rollers 80 is mounted by an individual bearing 90 for rotation about an axis extending radially outwardly from the axis of rotation of drive member 76. These bearings are in turn carried by individual adjustably positioned carrier elements 91, which are mounted to posts 92 projecting radially outwardly from body 82. Each of the posts 92 extends through an opening in the corresponding element 91, to mount element 91 for sliding movement along the post radially of body 82. Such radial movement of element 91 effects corresponding radial adjustment of the roller, to vary the relative rates of rotation of drive member 76 and the roller. The radial position of element 91 is adjusted by a screw 93, which extends through a threaded bore within element 91 and at its inner end engages body 82. Screw 93 may be positively retained in any adjusted condition by means of lock nut 94. The position of roller 80 is indicated by the position of element 91 relative to a series of markings 95 on post 92.

A dispensing operation is started or stopped by actuation of roller 80 into or out of engagement with face 79 of the drive member. To permit such movement of the roller, each of the roller mounting bearings 90 is mounted at 96 for pivotal movement relative to the corresponding carrier element 91. The bearing is pivoted relative to element 91 between these two positions by a suitable power unit preferably adapted for fluid pressure actuation. This power unit may comprise a power cylinder 97 carried by element 91 and a piston 98 within the cylinder having its rod 99 pivotally connected to bearing 90 at a location 100 offset from the point 96 at which the bearing is pivotally mounted. Compressed air is introduced to cylinder 97 through line 101, to actuate the cylinder in a manner moving roller 80 into engagement with face 79.

In mounting the apparatus to a road striping machine, one or more of the dispenser units 17 may be mounted to the rear of the machine carriage. A single drive unit is then attached to the carriage, and each of the dispensers is connected by a flexible rotary drive shaft 20 to one of the rollers 80 of the drive unit. Hoses 39 may then be connected between the bead inlets 38 of the different dispensers and one or more bead reservoirs.

During such mounting of the dispensers to the road striping machine, chambers 21 and 22 may be rotatably adjusted relative to carriage 11 and each other in a manner greatly facilitating their attachment to bead supply hose 39 and flexible drive shafts 20. As will be understood, such rotational adjustment is permitted by clamp 33 and mounting element 176.

Air lines 74 and 101, to the dispenser and drive units, respectively, are preferably connected to the same source of compressed air as the usual line 102 leading to the paint sprayer. All of these lines may be controlled by a single starting and stopping valve 103, so that opening of the valve will simultaneously commence the paint spraying operation, actuate rollers 80 into engagement with face 79 to start the dispensing operation, and deliver air to the dispensing units through line 74. If desired, a restriction 202 may be provided in the line leading to the bead dispensing apparatus, to introduce a lag into the operation of the bead dispensers, so that beads are not dispensed until a predetermined short period after the start of the spraying operation.

Before each use, the dispenser is adjusted for a desired width of stripe by rotary movement of the lower portion of the dispenser, and is adjusted for a desired rate of delivery by adjustment of screw 93. The carriage is then drawn along the road surface to be striped, and valve 103 is opened to start the striping operation. Such opening of valve 103 admits air to cylinders 97, to actuate pistons 98 in a manner moving rollers 80 into driven engagement with face 79. The resulting rotation of the rollers actuates shafts 20 to turn rotors 56 of the various dispensers, which commence to feed beads into the discharge chambers 24 of the dispensers to fall downwardly in a predetermined pattern onto the road surface. Because drive member 76 is driven directly by tire 13, any variations in speed of travel do not affect the density of bead distribution along the stripe, since each change in speed causes a corresponding change in the rate of bead delivery.

I claim:

1. A road striping bead dispenser to be mounted to a carriage movable along a road surface, said dispenser comprising a body including a first section adapted for attachment to the carriage and a second section having a bottom downwardly projecting and downwardly opening discharge spout through which beads fall downwardly onto the road surface, said spout having a portion for defining the bead discharge pattern which portion extends entirely about and confines the beads as they pass downwardly therethrough and which portion is elongated in horizontal section to dispense beads over an elongated area, said spout being open to passage of beads downwardly therefrom along the major portion of the length of said elongated area, the path of the beads substantially directly downwardly from said spout to the road surface being unobstructed, means within the body for dispensing beads downwardly through said spout at a controlled rate, and a connection attaching said second of the body to said first section for relative rotary adjusting movement about an essentially vertical axis and to positions in which said spout is elongated in different horizontal directions relative to said first section and the carriage to thereby vary the width of area along which said spout deposits beads, said second body section being free to remain in a fixed adjusted position relative to the first body section as the carriage advances.

2. A road striping bead dispenser comprising a body to be mounted to a carriage movable along a road surface and containing three vertically successive chambers, means for introducing beads to be dispensed into the middle one of said chambers, a rotor in the lower of said chambers mounted for rotation about a generally vertical axis and containing a plurality of metering compartments open at their upper and lower sides and positioned about said axis for movement thereabout as the rotor turns, means forming a passage through which beads may fall from said middle chamber into said rotor compartments at a predetermined filling point along their path of circular travel, a bottom wall extending across the underside of said rotor and containing an opening at a location circularly offset from said filling point through which the beads fall downwardly from said compartments, a tubular discharge spout structure extending downwardly beneath said bottom chamber about the path of beads from said last mentioned opening and acting to direct the beads through a bottom opening of the spout structure onto the road surface in a predetermined pattern, an essentially vertical shaft for rotatably driving said rotor extending upwardly therefrom through said middle chamber and into said upper chamber, and means extending into said upper body chamber for continuously rotatively driving said shaft and through it the rotor, said last mentioned means including a rotating drive shaft extending into said upper body chamber from the outside thereof, and a drive connection in said upper body chamber for driving said first mentioned shaft from said drive shaft, said upper chamber being closed against substantial communication with the atmosphere or with said middle chamber, said body comprising three vertically successive sections, and connections attaching said sections together for relative rotary adjustment about a vertical axis, the upper two of said sections containing the upper two of said chambers respectively, the lower of said sections including said tubular discharge spout structure, and said spout structure having an open bottom end elongated in a horizontal direction.

References Cited in the file of this patent

UNITED STATES PATENTS

| | | |
|---|---|---|
| 154,842 | Codville | Sept. 8, 1874 |
| 339,454 | McWhorter | Apr. 6, 1886 |
| 639,437 | Robinson | Dec. 19, 1899 |
| 807,627 | Marble | Dec. 19, 1905 |
| 888,265 | Ruland | May 19, 1908 |
| 1,111,577 | Hampton | Sept. 22, 1914 |
| 1,198,092 | Wilhelm et al. | Sept. 12, 1916 |
| 1,204,111 | Anderson | Nov. 7, 1916 |
| 1,209,507 | Smallwood | Dec. 19, 1916 |
| 1,474,599 | Martin | Nov. 20, 1923 |
| 1,657,393 | Hase | Jan. 24, 1928 |
| 1,703,083 | Abbott | Feb. 26, 1929 |
| 1,724,805 | Root | Aug. 13, 1929 |
| 1,876,409 | Gordon | Sept. 6, 1932 |
| 2,150,767 | Heim | Mar. 14, 1939 |
| 2,309,362 | Trautvetter | Jan. 26, 1943 |
| 2,314,031 | Colburn | Mar. 16, 1943 |
| 2,369,983 | Rodli et al. | Feb. 20, 1945 |
| 2,543,517 | Anderson | Feb. 27, 1951 |
| 2,546,702 | Ready | Mar. 27, 1951 |
| 2,550,781 | Colburn | May 1, 1951 |
| 2,575,985 | Thompson | Nov. 20, 1951 |
| 2,593,960 | Ballew | Apr. 22, 1952 |
| 2,594,084 | Skibbe et al. | Apr. 22, 1952 |
| 2,609,124 | Bergstrom | Sept. 2, 1952 |
| 2,641,476 | Keleher | June 9, 1953 |
| 2,673,090 | Blumberg | Mar. 23, 1954 |

UNITED STATES PATENT OFFICE
CERTIFICATE OF CORRECTION

Patent No. 2,833,542                                                                     May 6, 1958

Earnest E. Martin

It is hereby certified that error appears in the printed specification of the above numbered patent requiring correction and that the said Letters Patent should read as corrected below.

Column 8, line 45, after "second" insert --section--.

Signed and sealed this 8th day of July 1958.

(SEAL)
Attest:

KARL H. AXLINE
Attesting Officer

ROBERT C. WATSON
Commissioner of Patents